(12) United States Patent
Spriano

(10) Patent No.: US 11,993,193 B2
(45) Date of Patent: May 28, 2024

(54) STRUCTURE FOR TRANSPORTING FOODSTUFFS

(71) Applicant: Sprint Innovative Solutions S.r.l., Milan (IT)

(72) Inventor: Simona Nicoletta Camilla Spriano, Milan (IT)

(73) Assignee: Simona Spriano, Milan (IT)

( * ) Notice: Subject to any disclaimer, the term of this patent is extended or adjusted under 35 U.S.C. 154(b) by 902 days.

(21) Appl. No.: 16/979,450

(22) PCT Filed: Mar. 27, 2019

(86) PCT No.: PCT/EP2019/057758
§ 371 (c)(1),
(2) Date: Sep. 9, 2020

(87) PCT Pub. No.: WO2019/197162
PCT Pub. Date: Oct. 17, 2019

(65) Prior Publication Data
US 2021/0016969 A1   Jan. 21, 2021

(30) Foreign Application Priority Data

Apr. 9, 2018  (IT) .......................... 102018000004311
Jan. 25, 2019  (IT) .......................... 202019000000285

(51) Int. Cl.
*B60P 3/00*  (2006.01)
*B65G 9/00*  (2006.01)
*B62J 9/28*  (2020.01)

(52) U.S. Cl.
CPC .............. *B60P 3/007* (2013.01); *B65G 9/002* (2013.01); *B62J 9/28* (2020.02); *B65G 2201/0202* (2013.01)

(58) Field of Classification Search
CPC . B60P 3/007; B65G 9/002; B65G 2201/0202; B62J 9/28; A47J 47/14;
(Continued)

(56) References Cited

U.S. PATENT DOCUMENTS 1,628,504 A * 5/1927 Stanislaus ................ A47F 5/108
                                                            206/557
2,085,983 A * 7/1937 Jordan ..................... A47F 5/108
                                                            211/85
(Continued)

FOREIGN PATENT DOCUMENTS

CN    203877740    10/2014
DE    19938608     2/2001
(Continued)

*Primary Examiner* — Ko H Chan
(74) *Attorney, Agent, or Firm* — Themis Law

(57) ABSTRACT

A structure for transporting ready-made meals and various kinds of foodstuffs includes a supporting framework, at least one shelf adapted to support the foodstuffs, the at least one shelf (being constrained to a central top portion of the framework with a pendulum suspension device, so that the at least one shelf always maintains a substantially horizontal position regardless of the configuration of the external supporting framework, the symmetry axis of the structure coinciding with the symmetry axis of the pendulum device.

22 Claims, 12 Drawing Sheets

(58) Field of Classification Search
CPC .. A47G 23/0616; A47B 43/00; A47B 43/003; A47B 43/006; A47F 5/108
See application file for complete search history.

(56) References Cited

U.S. PATENT DOCUMENTS

| | | | | | |
|---|---|---|---|---|---|
| 2,240,960 | A | * | 5/1941 | Sherwood | A47F 5/108 211/130.1 |
| 4,365,421 | A | * | 12/1982 | Byrum | G01C 9/06 200/220 |
| 5,096,072 | A | * | 3/1992 | Link | A47F 5/13 211/195 |
| 7,077,373 | B1 | * | 7/2006 | Hoebener | F16M 11/10 248/316.1 |
| 7,445,188 | B2 | * | 11/2008 | Lamparter | B60R 5/003 312/246 |
| 9,668,600 | B1 | * | 6/2017 | Lau | A47J 47/14 |
| 2011/0172071 | A1 | * | 7/2011 | Piane, Jr. | A63B 22/16 482/142 |
| 2019/0059536 | A1 | * | 2/2019 | Farro | A45F 3/04 |

FOREIGN PATENT DOCUMENTS

| | | |
|---|---|---|
| EP | 0516969 | 12/1992 |
| GB | 2150901 | 7/1985 |
| WO | 02094647 | 11/2002 |

\* cited by examiner

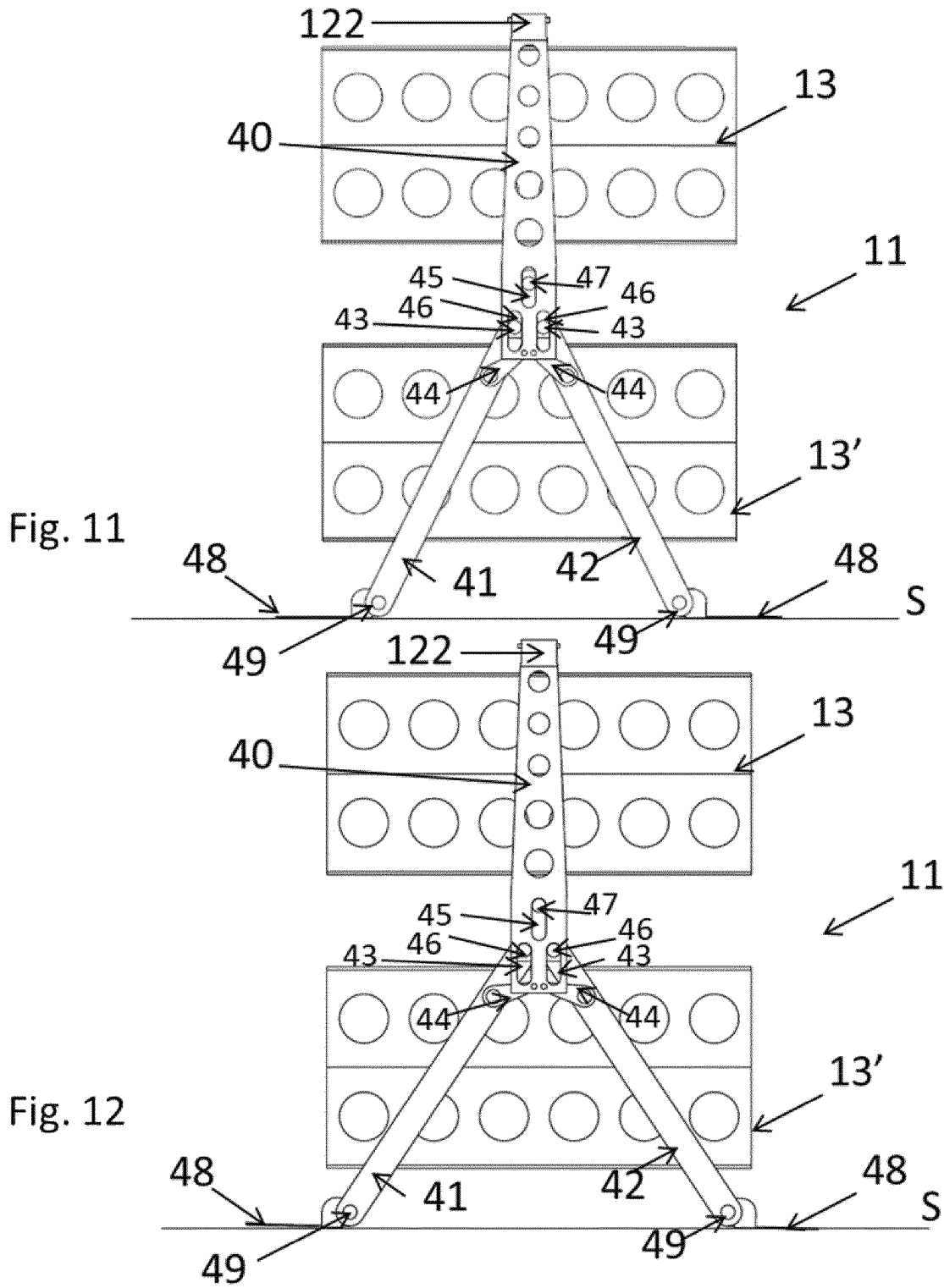

STRUCTURE FOR TRANSPORTING FOODSTUFFS

The present invention relates to a structure for transporting foodstuffs, such as ready-made dishes and various kinds of food.

As is well known to experts in the catering sector, the home delivery of ready-made dishes or prepared meals is generally constantly increasing.

The delivery of ready-made meals, which can consist of one or more courses, is generally carried out by operators using various types of bicycles or motorcycles.

In order to carry out this type of transportation, the operator uses a container in which the "ready-made dish" is stored using various types of casings.

It is evident that, due to the transportation, the food inside the container is subjected to forces that tend to modify its original position/presentation, which makes it practically unpresentable or unattractive to whoever is going to use it.

A similar argument can be made for traditional pizzas which, placed in special cardboard food containers, are delivered by means of thermal bags or the like, transported in special motorbike holders or even simple bicycles. The pizzas are subject to the same problems, even if to a different extent, as their components are generally retained by the pizza itself where they have been inserted during cooking or not.

WO 02/094647 relates to a structure for dispensing trolley-type tools provided with a suspension rod and a shock-absorbing means.

GB 2150901 relates to a supporting structure for a suspended transporting system.

The general objective of the present invention is to solve the above technical problems and aforementioned drawbacks of the known art by providing a structure/container for transporting foodstuffs, in particular ready-made meals and pizzas, thanks to which the food/ready-made meal or pizza arrives at its destination as it was originally prepared.

A further objective of the present invention is to provide a container for transporting foodstuffs, in particular ready-made dishes or pizzas, in an extremely simple, economical and particularly functional way for the user.

Another objective of the present invention is possibly to provide a transporting structure for ready-made dishes using rucksacks or containers of those currently available on the market.

The above-mentioned objectives are achieved by a structure or a kit for transporting foodstuffs, such as ready-made dishes or various kinds of food or pizzas produced according to the independent claims 1 and 13 and the following subclaims depending thereon.

The structural and functional characteristics of the present invention and its advantages with respect to the known art will be even more evident from the following description, referring to the attached schematic drawings, which show embodiment examples of the same invention. In the drawings:

FIG. 4, a perspective view, and FIGS. 5 and 6, two sections at 90° with respect to each other of a pendulum suspension device forming part of the structure of the invention of FIGS. 1 to 3;

FIGS. 11 and 12 are raised side views of the structure of FIG. 8 in opening positions from the folded position of FIG. 10;

Figure 1:
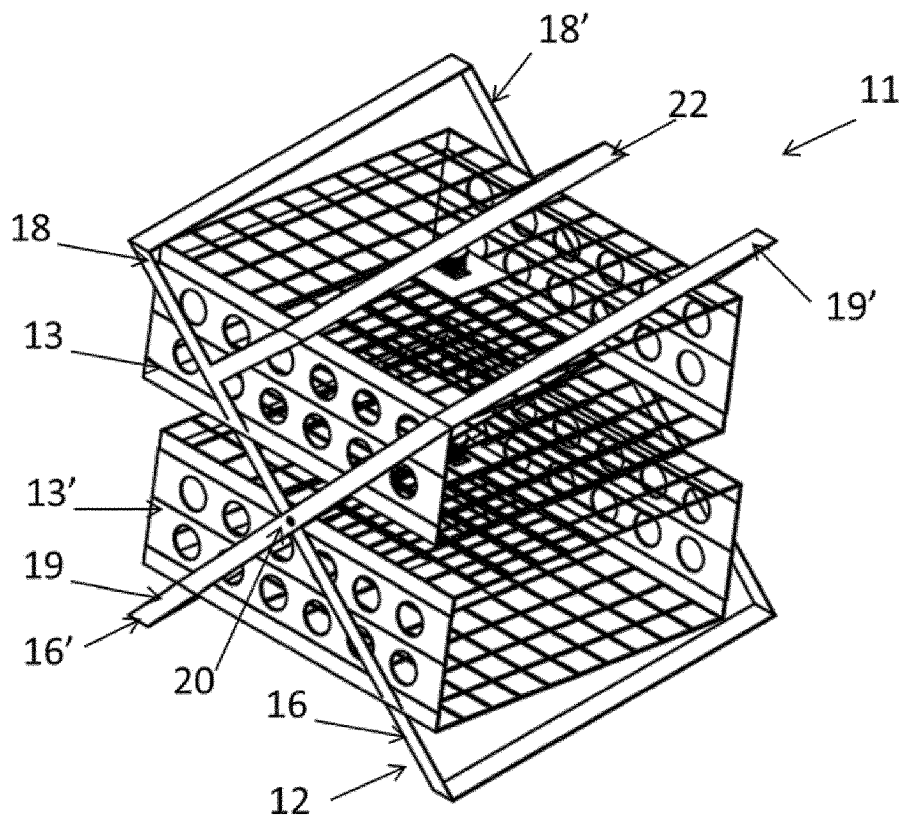
FIG. 1 is a perspective view of a structure for transporting foodstuffs according to the invention in a first embodiment.
Figure 2:
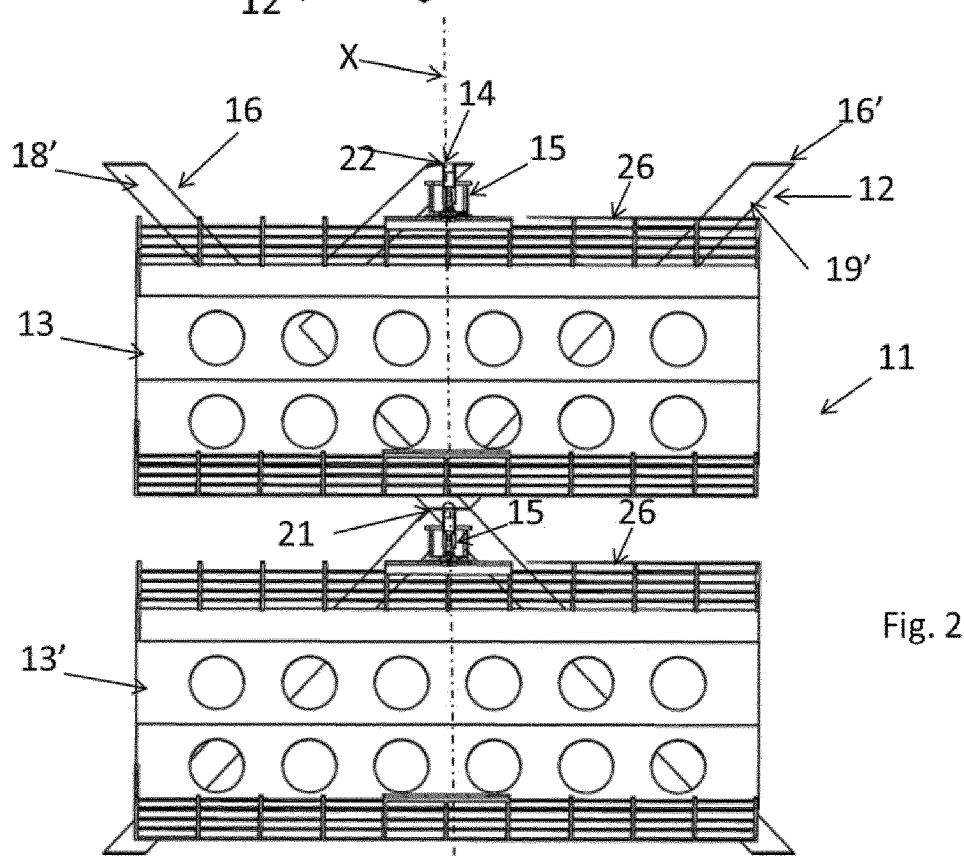
FIG. 2 is a partially sectional, raised side view of the structure of FIG. 1.
Figure 4:
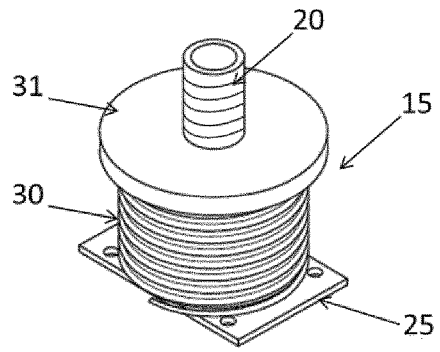
FIGS. 4, 5 and 6 are.

With reference to FIGS. 1 to 18 in general, a first example of a structure or system for transporting ready-made meals and various kinds of foodstuffs is indicated as a whole with 11.

Said structure 11 comprises, in combination, a supporting framework, indicated as a whole with 12, and at least one shelf 13 for supporting foodstuffs or ready-made dishes (not shown).

The invention further provides that in this structure 11, the at least one shelf 13 is constrained to a top central point 14 of the supporting framework 12 by means of a pendulum suspension device 15, which allows free movement in space of the at least one shelf 13, simply subject to the force of gravitation.

The arrangement of the pendulum suspension device 15 in space ensures that the shelf 13 always maintains a substantially horizontal position regardless of the configuration of the external supporting framework 12.

It can also be noted that a symmetry axis X of the above-mentioned structure coincides with a symmetry axis of the pendulum suspension device 15.

Particular attention should be paid to what is illustrated in FIGS. 1 to 7 which refer to a first embodiment of the structure for transporting ready-made meals and foodstuffs, shown for exemplifying and non-limiting purposes.

In this example, the framework 12 provides a pair of quadrilateral frames 16 and 16', consisting of four rods, which surround the at least one shelf 13. In particular, the two quadrilateral frames 16 and 16' are hinged together in an intermediate area on opposite sides 18, 19 and 18', 19' in a pivot 20 connected by a central rod 21 transverse to the structure.

One of the two frames, for example the frame 16, provides a further upper shaped rod 22 positioned astride with respect to the shelf 13 and which is arranged parallel to the top of the central rod 21.

In this way the pendulum suspension device 15 is positioned integral with this shaped rod 22 and the at least one shelf 13 extends below it.

In the example shown, in particular, the shelf 13 provides a box-shaped structure open at opposite ends to receive a ready-made meal or various kinds of food packaged in a container or dish.

The shelf 13, for example, is produced with lightweight perforated metal sheets and/or mesh elements which has the above-mentioned pendulum suspension device 15 in a central upper part. This is a non-limiting exemplary solution and is only a possibility that can be substituted by or implemented together with other solutions. This foldable solution does not constitute a limit with respect to other possible solutions.

Furthermore, in the example shown, a second shelf 13' is also provided, also equipped with a pendulum suspension device 15 connected to the above-mentioned central rod 21 transversal to the structure.

Figure 3:
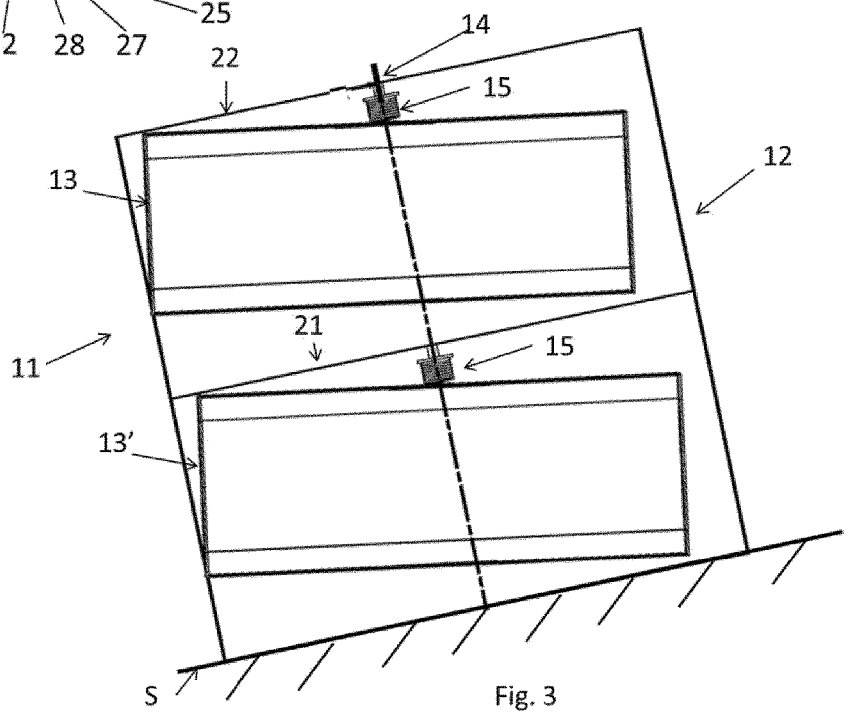
FIG. 3 is a schematization of the structure of FIG. 1 when placed in a curve on a vehicle with the relative internal arrangement of the shelves.

The two shelves thanks to the provision of the two pendulum suspension devices 15 are arranged to follow the possible inclination of the external supporting framework 12 as its configuration changes. FIG. 3, in fact, shows how the structure appears when placed for example on a support S of a motor vehicle or bicycle following a curve. The two shelves 13, 13' are arranged horizontally thanks to the arrangement of the two pendulum suspension devices 15 connected to the framework 12.

Furthermore, in a non-limiting embodiment such as that shown, the pendulum suspension device 15 provides a coupling plate 25 to a lightweight perforated sheet and/or mesh element 26, in a central upper part of the shelf 13, 13'.

Figure 5:
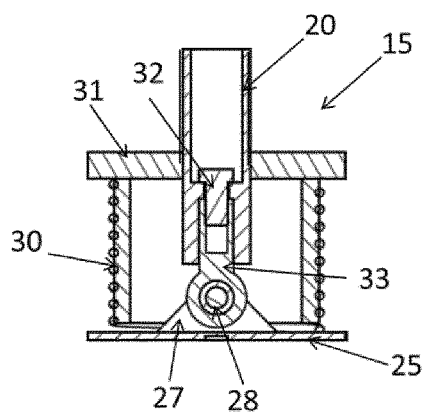
Figure 6:
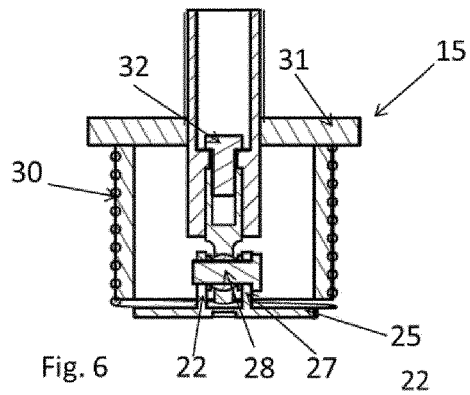

In this example, moreover, the pendulum suspension device 15 provides that slots 27 extend from the coupling plate 25, one of which, shown in FIG. 5, is suitable for receiving a pin 28. The pin 28 is inserted in a hole 29 of a stem 33, articulated to the same pin 28. The stem is suitable for being inserted in a tubular element 20, in which it is abutted, which forms the element that allows the pendulum suspension device 15 to be suspended to the central transverse rods 21 or upper shaped rod 22.

An elastic spring element 30 is positioned between the coupling plate 25 and an upper ring nut 31 capable of being screwed-unscrewed with respect to the externally threaded tubular element 20, providing damping between the parts. This damping is of the adjustable type as the externally threaded tubular element 20 is provided so as to be able to vary the height of the spring 30, and therefore its force, without varying the position of 28 with respect to 20, but using the adjustment ring 31 that is screwed/unscrewed along the external threading of the tubular element 20.

It is evident that the two four-sided frames 16 and 16' which form the framework 12 in their lower part can be constrained and/or arranged on a part of a transportation vehicle such as a bicycle, a motorcycle, or even a motor vehicle.

It has been seen that this arrangement according to the invention exploits gravity to stabilize the load by functioning as a pendulum.

For example, much more simply, the pendulum suspension device 15 can consist of a ball joint, a flexible joint or a cardan joint.

This device allows rotation in every direction allowing a continuous adjustment of the shelf to the position acquired by the framework 12 of the transporting structure 11 of the invention as shown in FIG. 3.

Figure 7:
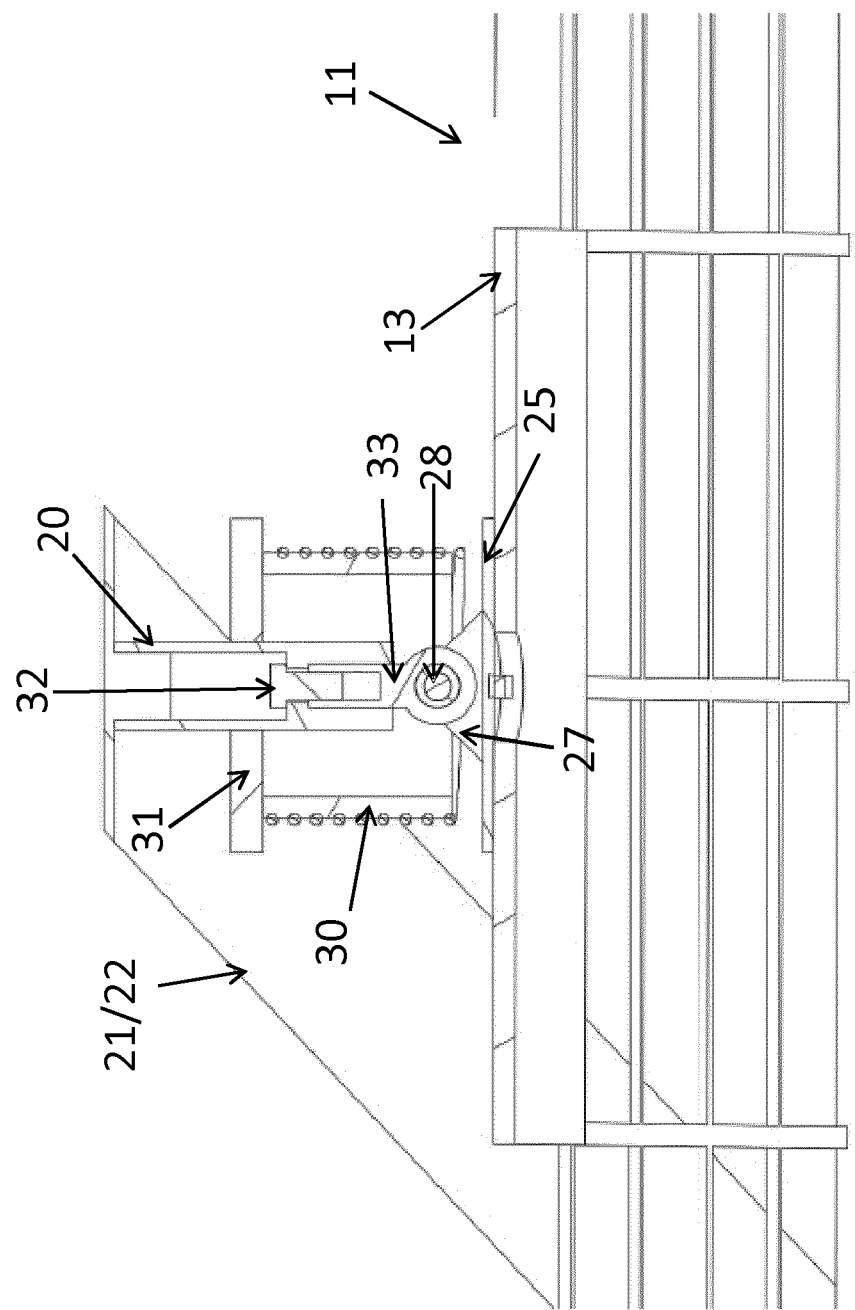
FIG. 7 is a sectional perspective view showing a pendulum suspension device applied to a crossrod of the framework.

FIG. 7 shows a sectional perspective view showing a pendulum suspension device 15 applied to a crossrod 21 or 22 of the framework 12.

In a further embodiment, not shown, two supporting shelves can be provided, a first shelf which is suspended from the framework and a second shelf which is directly suspended below the first shelf.

FIGS. 8 to 12 show a second embodiment of the structure for transporting foodstuffs according to the invention.

This second embodiment differs from that of FIGS. 1 to 7 due to the shape of the framework. The same elements are indicated with the same reference numbers for the sake of simplicity.

Also in this further example, there is the provision that a structure or system for transporting ready-made meals and various kinds of foodstuffs 11 comprises, in combination, a supporting framework, indicated as a whole with 112, and at least one shelf 13 for supporting foodstuffs or ready-made dishes, wherein a second shelf 13' follows the first shelf 13.

Also in this case the shelf 13 or 13' is constrained to a central top point of the supporting framework 112 by means of a pendulum suspension device 15, which allows free movement in space of the single shelf 13 or 13', simply subject to the force of gravitation. And also in this case, the provision of the pendulum suspension device 15 causes the shelf 13, 13' to always maintain its substantially horizontal position regardless of the configuration of the external supporting framework 112.

In this case, the external supporting framework 112 comprises a C-shaped upper part provided with vertical side rods 40 connected by a central upper rod 122 on which the pendulum suspension device 15 of a first shelf 13 is attached. This is followed by a lower part of the framework 112 which includes pairs of legs or rods 41, 42 arranged on each side of the vertical side rods 40. These rods 41, 42 have holes 55 at one of their ends, which receive pins 43. The pins 43, moreover, are also arranged to slide in two slots 46, parallel to each other and formed at the end of the vertical side rods 40. Furthermore, each rod has a connecting rod 44 respectively constrained, articulated at the ends, to the legs 41, 42 and at the other end to the lateral vertical rod 40. In this way, a mechanism is formed which allows the movement of the two legs 41, 42 to be correlated for each side of the framework 112. Furthermore, this mechanism has the purpose of adjusting the structure in height and automatically balancing the height of the two shelves 13, 13'.

A further lower central rod 121 is also provided which connects the two pairs of legs 41, 42 arranged on the two sides of the framework 112 and on which a further pendulum suspension device 15 of a second shelf 13' is attached.

This arrangement also allows the use of shelves 13, 13' having a different height and containing capacity.

Figure 8:
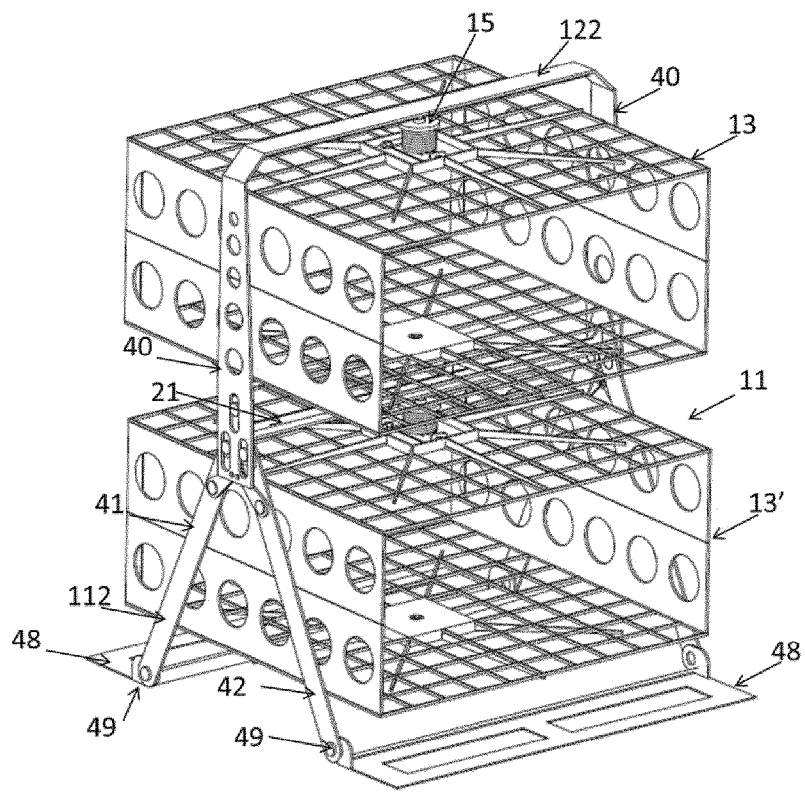
FIG. 8 is a perspective view of a structure for transporting foodstuffs according to the invention in a second embodiment.
Figure 9:
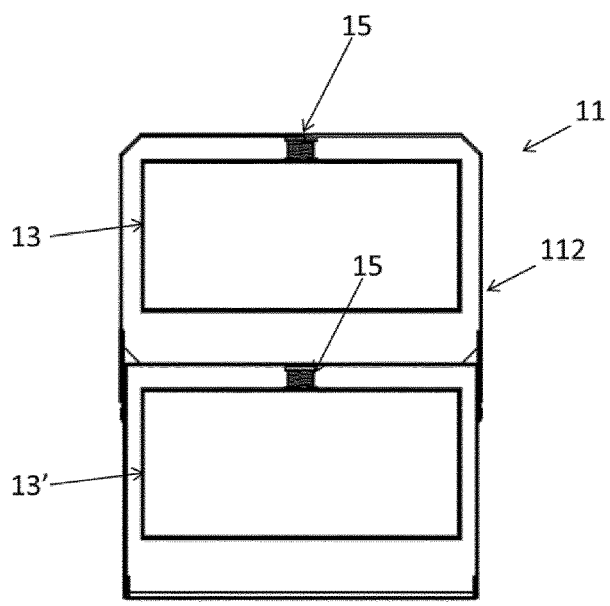
FIG. 9 is a raised side view of the structure of FIG. 8 in a schematic form.
Figure 16:
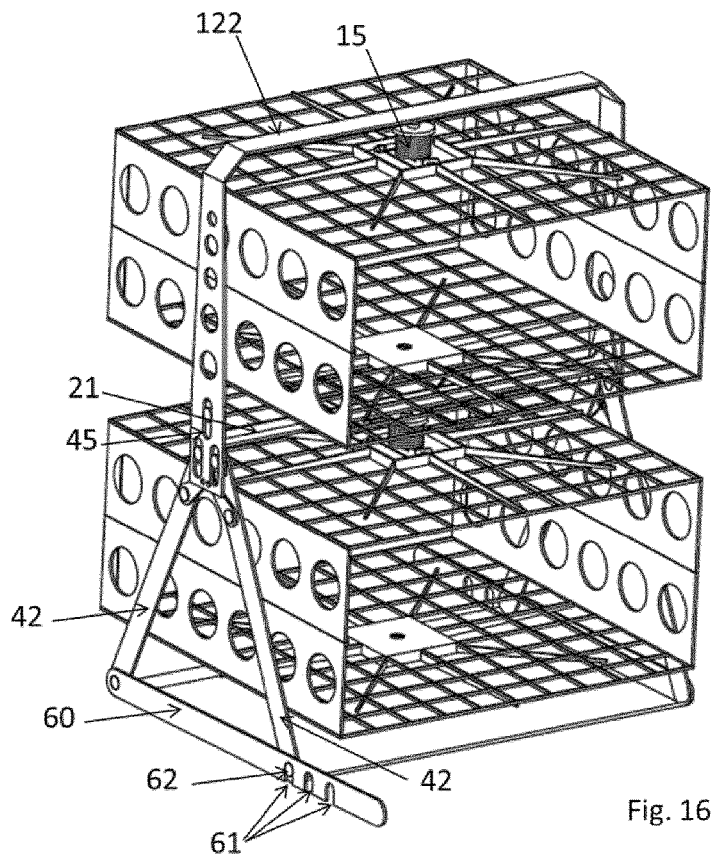
FIG. 16 is a perspective view of a structure for transporting foodstuffs according to the invention in a further embodiment.
Figure 17:
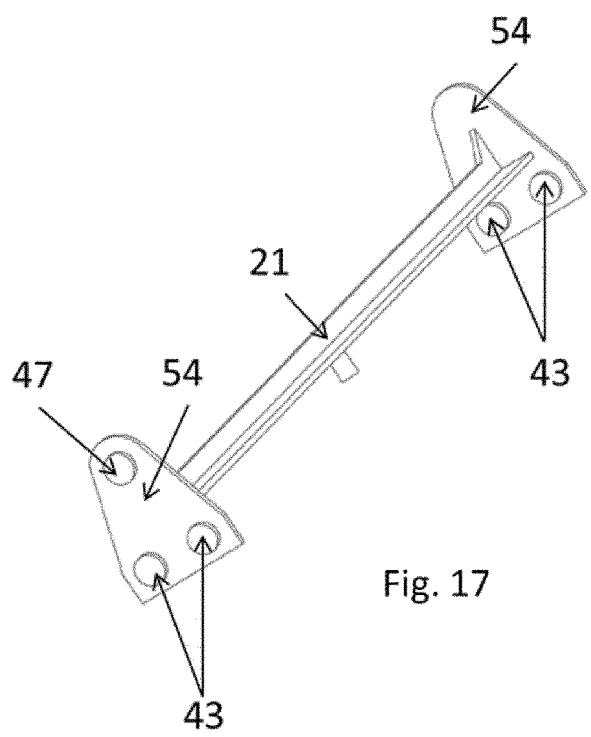
FIGS. 17 and 18 show perspective views of details of the structure of the embodiments of FIGS. 8 and 16.
Figure 18:
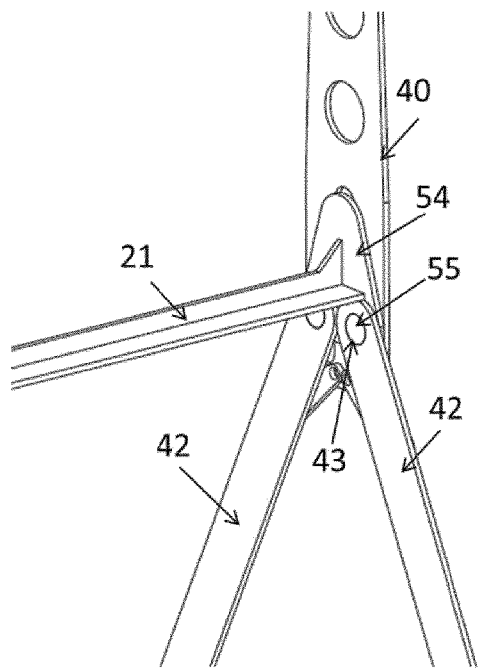

FIGS. 11 and 12, as well as FIGS. 17 and 18 show in raised and perspective views, positions and details of the structure of the embodiments of FIGS. 8 and 16. In particular they show how there is also a third slot 45 formed in the vertical side rod 40 in which a pin 47 slides and extends from a same bracket 54 on which the pins 43 are also inserted, the pin 47 stabilizes the system with respect to transverse loads. The presence of the three slots 45, 46 and the two connecting rods 44 connected to the supporting legs 41, 42 of the framework 112 move the same so that it is forced to slide symmetrically through the three pins 47, 43 which slide in the slots 45, 46. There are actually two brackets 54, one on each side in the structure, and the central crosspiece or rod 21 on which the pendulum suspension device 15 is positioned, is arranged between them.

Figure 10:
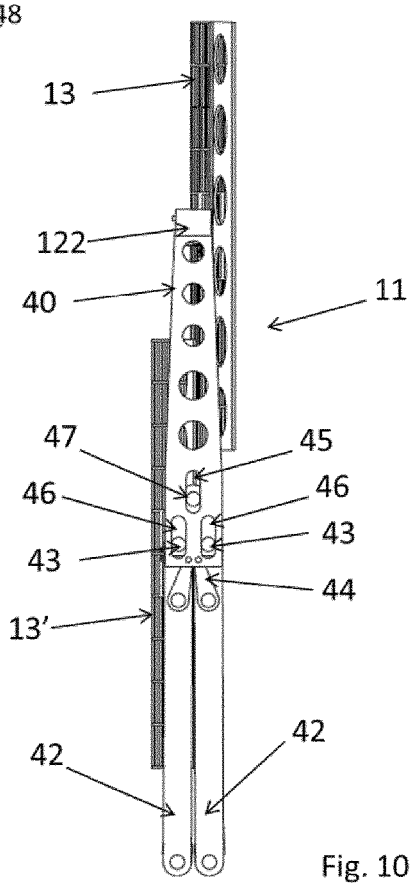
FIG. 10 is a raised view of the structure of FIG. 8 when folded over itself to form minimum encumbrance.

An elastic element or tension spring can also be provided, which creates the return force that cooperates and brings the framework to re-close and fold as shown in FIG. 10.

FIG. 12 also shows how, in an operating position, the structure of the invention can provide a pair of supporting surfaces 48 articulated at 49 with the pairs of legs 41, 42 arranged on opposite sides of the framework 112, which cooperate in obtaining a stable positioning of the structure of the invention. They are arranged, in fact, open and resting on the underlying supporting surface, for example a support S of a motor vehicle or bicycle.

The embodiment of FIG. 16 shows the presence of adjustments which allow the general configuration of the structure to be varied. At a lower end, in fact, one of the legs 41 is hinged to the same by a rod 60. Said rod 60 provides, near the other end thereof, a series of recesses 61 suitable for receiving a pin 62 positioned at the free end of the second leg 42. In this way, a stable position of the structure can be adjusted according to the variable height of the shelf and its position, which can be adapted in height to different containers to be transported.

This allows the height of the compartments defined in the single shelf to be equated. Furthermore, in an example not shown, there is also the possibility of an adjustment in width.

Figure 13:
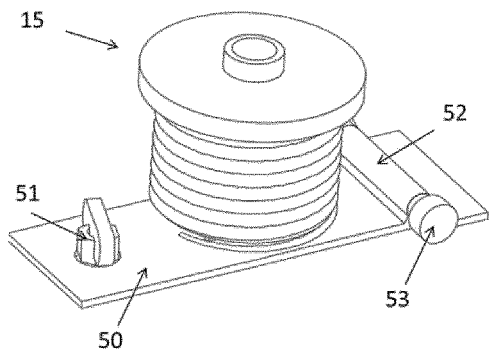
FIG. 13 is a perspective view showing a pendulum suspension device forming part of the structure of the invention in a different embodiment among those possible.
Figure 14:
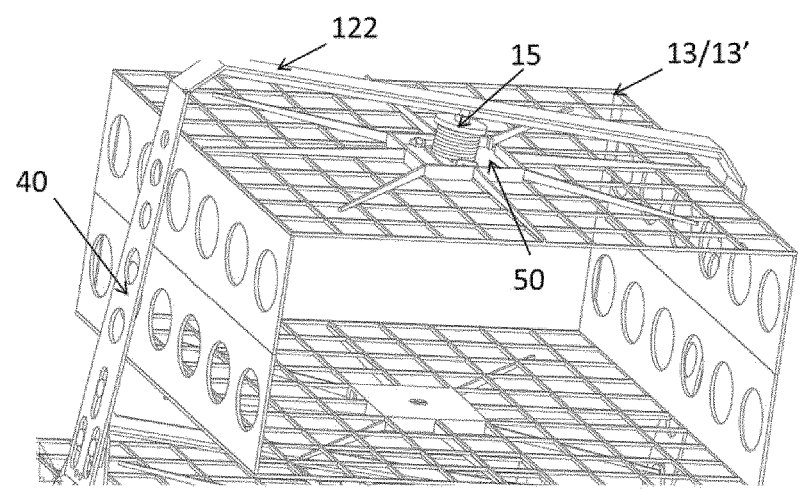
FIGS. 14 and 15 show a perspective view of the application of the device of FIG. 13 both in a working position and in the closed folded position.
Figure 15:
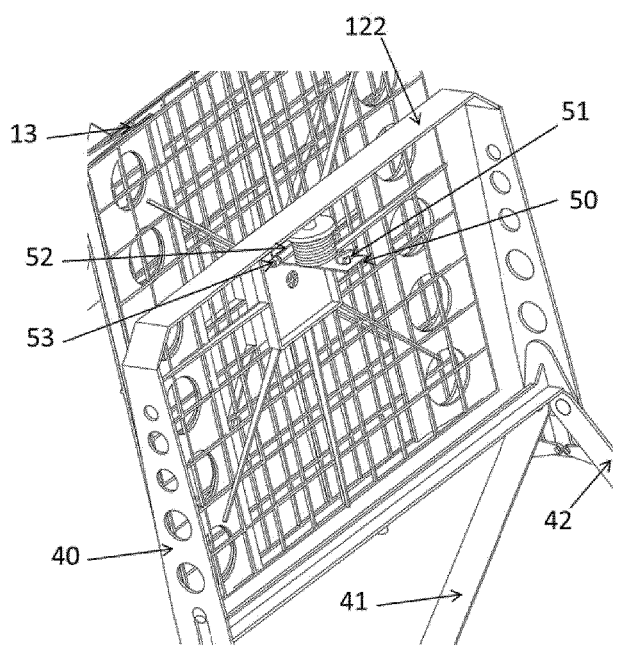

FIGS. 13 to 15 show a pendulum suspension device forming part of the structure of the invention in a different embodiment of those possible.

In this further example the pendulum suspension device has a different attachment to the framework 12.

The device is connected at the top to the crosspiece 22 and at the bottom has a plate 50 which is blocked to an upper wall of the shelf 13, 13' by a blocking screw 51 on one side. A tubular element 52 is provided on another side of the plate 50, in which a pin 53 is inserted for blocking and rotating the plate 50.

FIGS. 14 and 15 show a perspective view of the application of the device of FIG. 13 in both an operating position and in the closed folded position.

It can therefore be noted that, according to a first characteristic of this embodiment, a pendulum suspension device having a different connection to the framework 12 allows the shelf 13, 13' to be replaced with another having different dimensions.

This can be effected very simply by first unscrewing the blocking screw 51 from the upper wall of the shelf 13, 13'. Secondly, the pin 53 must be removed from the tubular element 52 integral with the plate 50, completely freeing the shelf 13, 13'. In this case, the pin 53 is of the freely removable type.

Furthermore, according to a second characteristic of this embodiment of a pendulum suspension device, the shelf 13, 13' can be folded from the operating position (for example of FIG. 8) to the folded resting position (for example of FIG. 10).

This occurs by simply unscrewing the blocking screw 51 from the upper wall of the shelf 13, 13' which is in an operating position (FIG. 14) releasing it.

In this way, the shelf 13, 13' can rotate to the position shown in FIG. 15 having a minimum encumbrance. This arrangement is particularly interesting because if one had to rely only on the flexibility of the pendulum suspension device, for example in the form of a ball or flexible joint, it would only be possible to tilt it by 90°.

Figure 19:
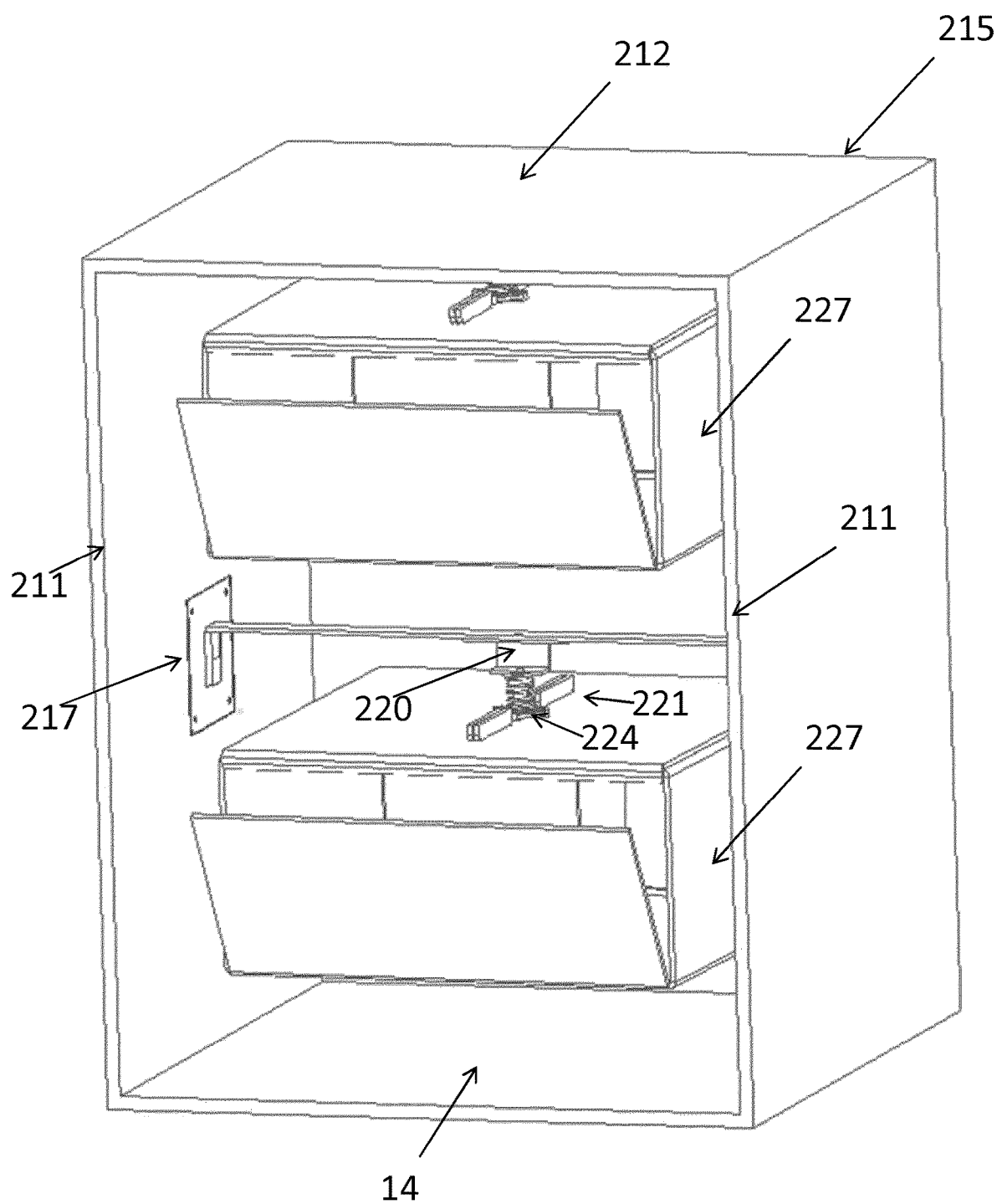
FIG. 19 shows a perspective view of a further structure for transporting foodstuffs obtained with a mounting kit according to the present invention.
Figure 20:
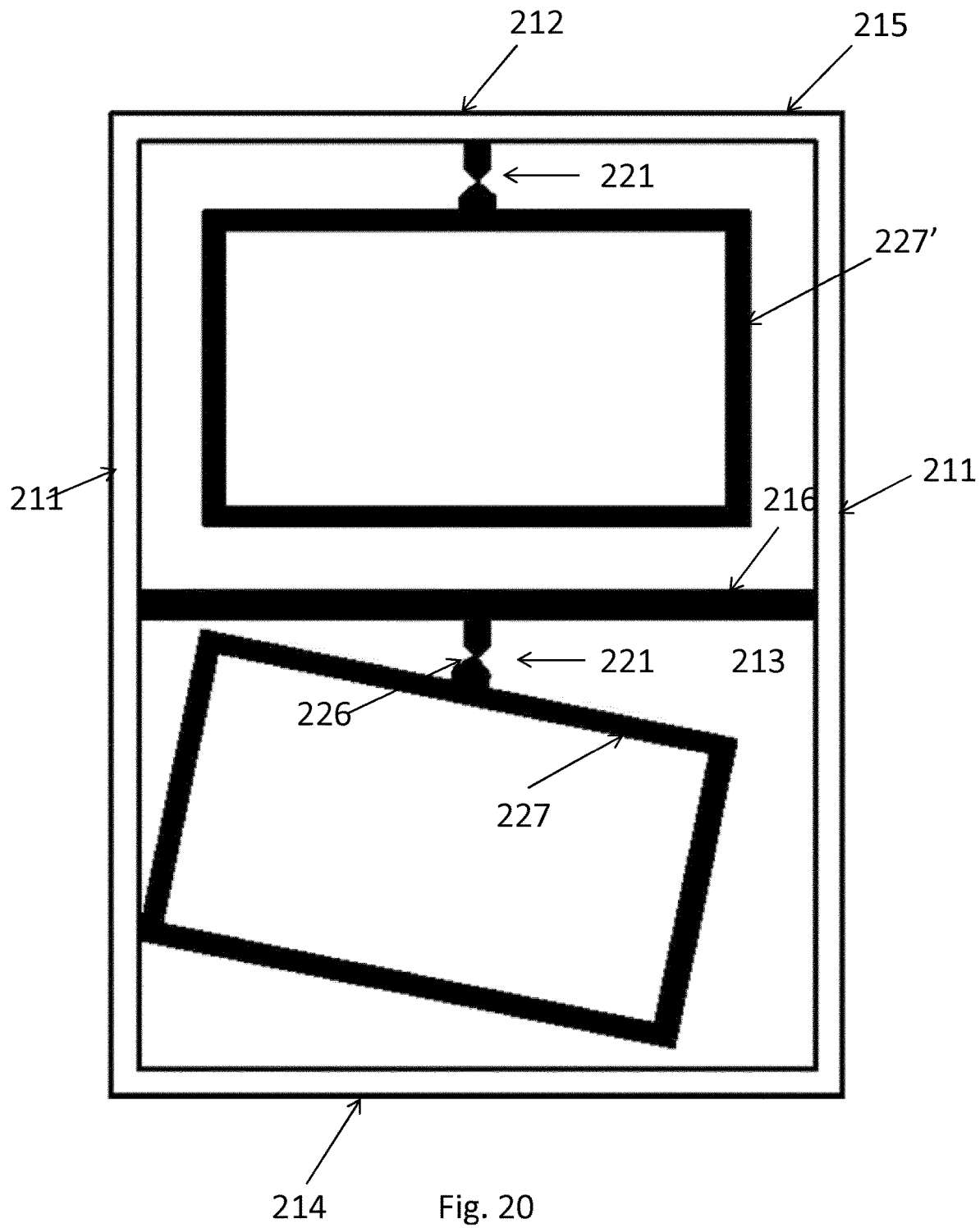
FIG. 20 shows a front view of the structure of FIG. 19 in operative working and transporting positions.
Figure 21:
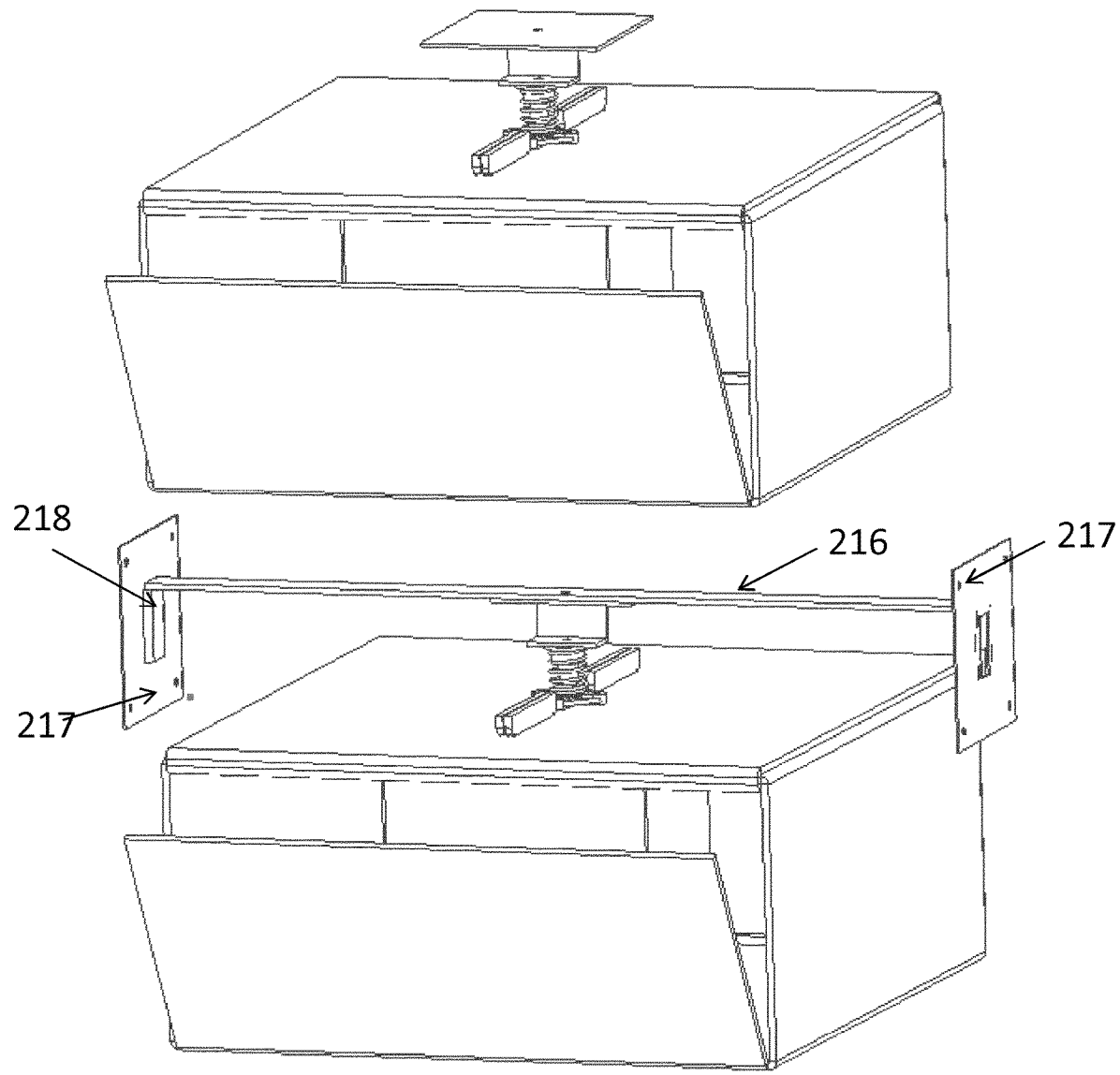
FIG. 21 shows, in a perspective view, only the elements inside the transporting structure of FIG. 19.
Figure 22:
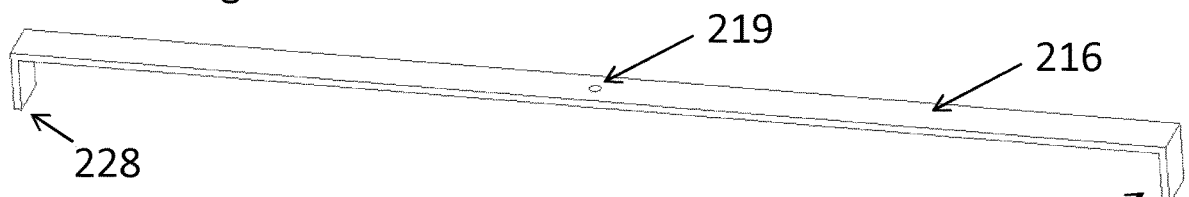
FIGS. 22, 23, 24 and 25 show, in a series of enlarged perspective views, a crosspiece, a suspension bracket, a pendulum suspension device and an end plate, respectively, which form part of the mounting kit which is used inside the box-shaped containment structure for positioning the containment shelves.
Figure 23:
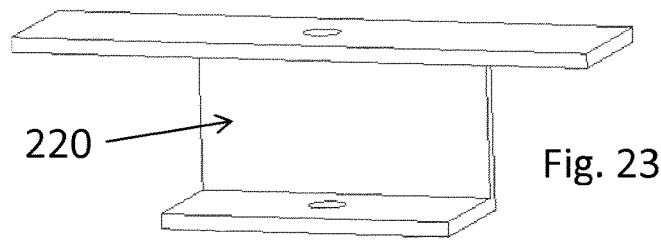
Figure 24:
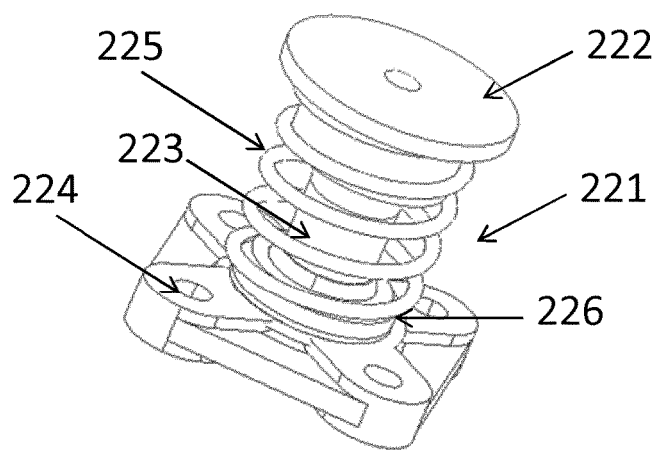
Figure 25:
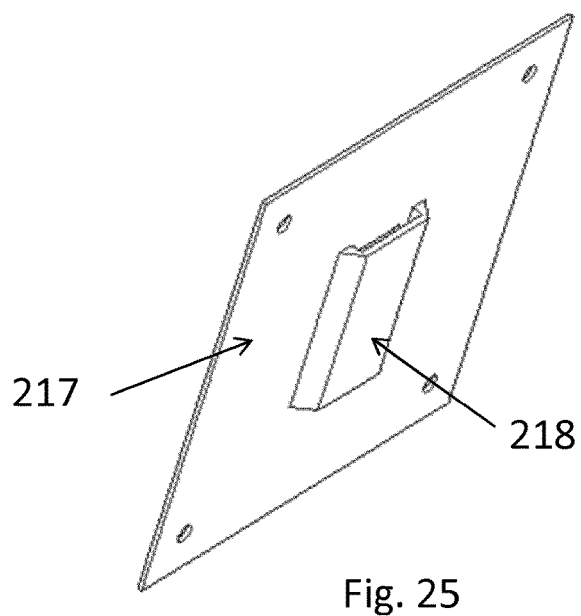

With reference now to FIGS. 19 and 20, these show by way of non-limiting example, another embodiment of a structure for transporting foodstuffs, obtained using a mounting kit for said transporting structure according to the invention.

The mounting kit of the present invention is suitable for being arranged inside a food-transporting structure of the box-shaped type, such as for example a rucksack or the like.

This box-shaped structure or rucksack comprises, in combination, external side 211, upper 212, rear 213 and lower 214 supporting walls, which are closed by a removable front wall, such as that applicable with a hinge (not shown). This type of structure is indicated as a whole by 215 and, as already mentioned, can consist, for example, of a usual rucksack or the like on the market.

The elements of the kit are arranged inside this box-shaped structure starting from a transverse strut 216, positioned between opposite side walls 11. Said strut 216 is installed thanks to end plates 217 made integral with the same walls 211. In particular, said end plates 217 provide recesses or housings 218 suitable for receiving curved or hook-shaped ends 228 of the strut 216.

In an intermediate area of the strut 216, a seat 219 is provided, suitable for receiving a suspension bracket 220 able to support an integral pendulum suspension device 221. Said device 221 provides for example an upper ring nut 222 capable of be screwed-unscrewed with respect to a tubular element 223, externally threaded. This tubular element 223 terminates at the bottom in a coupling plate 224 which allows an articulated constraint, as can be seen.

Between the coupling plate 224 and the upper ring nut 222, an elastic spring-like element 225 is arranged coaxially with respect to the tubular element 223 and provides damping.

The tubular element 223 at its end facing towards the coupling plate 224 for connection thereto, preferably provides a ball joint 226 which allows an oscillation between the coupling plate 224 and the suspension bracket 220.

In particular, damping is obtained by exploiting the friction of the joint or ball joint and, if necessary, by adding a rubber tube interposed between the pin 223 and the spring 225.

It should be remembered that the above-mentioned damping can be of the adjustable type as it is provided that the externally threaded tubular element 223 is able to vary the height of the elastic spring element 225, and therefore its force.

The coupling plate 224 is suitable for receiving constrained a containment shelf 227 for supporting and transporting ready-made dishes or other food products (not shown).

This description is specific for a food-transporting structure obtained using a mounting kit for this transporting structure according to the invention with a single shelf 227.

FIGS. 19 and 20, moreover, show a food-transporting structure obtained in which two containment shelves 227, 227' are provided. The lower one 227 in FIGS. 19 and 20 is exactly positioned as previously indicated. With respect to the containment shelf 227' arranged above, on the other hand, this is simply hung on the upper wall 212 of the transporting structure by means of a suspension bracket 220 specifically and directly associated with the upper wall 212. The suspension bracket 220 is thus capable of integrally supporting a pendulum suspension device 221 which is connected to the upper containment shelf 227'.

These examples show containment shelves specifically constructed by joining panels, but a containment shelf can also be produced otherwise.

Figure 26:
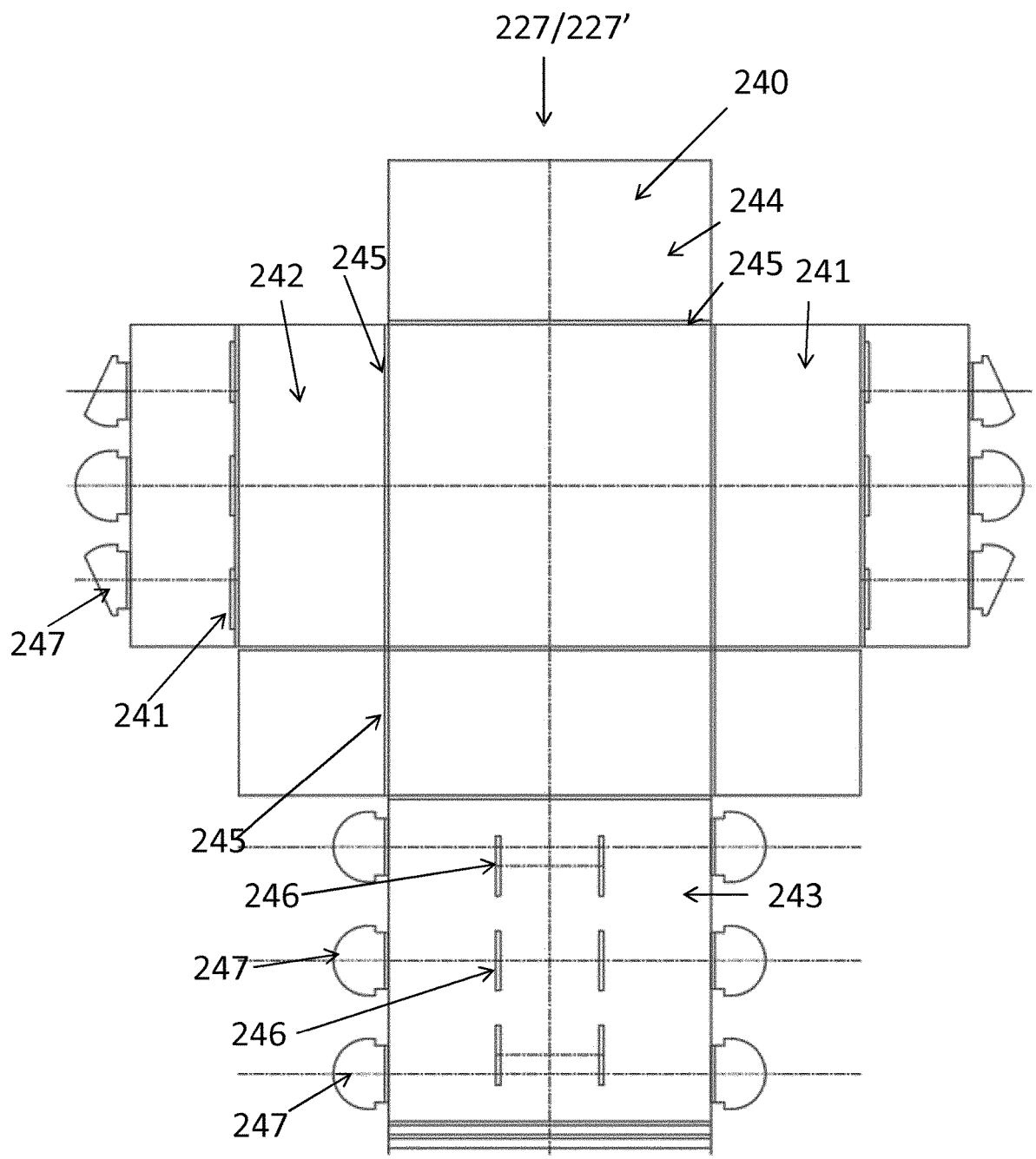
FIG. 26 is a plan view of the flat development of a containment shelf produced in a single piece that can be used in the present invention.

FIG. 26 in fact shows, through a plan view, the flat development of a containment shelf produced in a single piece. In this case, for example, alveolar polycarbonate sheet can be used which is at least partially sliced or punched as shown.

A series of panels 240, 241, 242, etc. are defined through this blanking operation, articulated to each other by means of bending invitation lines which then make up the walls of the containment shelf when formed.

During the blanking, in fact, both bending invitation lines 245 and blanked pass-through slits 246 are produced, in which connection tabs 247 are inserted, also formed in the blanking-punching operation.

The production of a containment shelf in a single piece as shown allows extremely low costs, an easy formation of the shelf and the possibility of substituting it with extreme rapidity at a low cost.

In this way, it is particularly, but not exclusively suitable for transporting pizzas or the like, as, when it is formed, it can have a size very close to that of a single product and can be replaced or even released to the end user by providing simple and releasable latches with respect to the pendulum suspension device 221, which remains on the rucksack or the like.

The provision of a pendulum suspension device 221 also allows free movement in space of the at least one shelf 227, 227' positioned in the rucksack or similar element, which is simply subject to the force of gravitation.

The arrangement of the pendulum suspension device 221 ensures that the shelf 227, 227' always maintains a substantially horizontal position regardless of the configuration of the transporting structure of the rucksack or similar external element.

Otherwise, alternatively, an upper containment shelf 227, 227' can be produced with the insertion of light or perforated sheets and/or mesh arrangements that partly cover the inside of the rucksack.

Furthermore, the provision that the containment shelves are carried by pendulum suspension devices 221 and are arranged to follow the possible inclination of the rucksack or similar element during transportation, is particularly advantageous.

As indicated so far, through the mounting kit for a food-transporting structure, a particularly advantageous food-transporting structure has thus been obtained which includes a rucksack or the like. Said rucksack or the like contains the mounting kit elements described and illustrated above.

The forms of the structure of the present invention, as also the materials and assembly modes, can obviously differ from those shown by way of non-limiting example in the drawings.

The objective mentioned in the preamble of the description has therefore been achieved.

The protection scope of the present invention is defined by the enclosed claims.

The invention claimed is:

1. A structure for transporting ready-made meals and various kinds of foodstuffs comprising:
    a supporting framework (12, 112); and
    a first shelf (13, 13') configured to support said foodstuffs,
    wherein said first shelf (13, 13') is adjoined to said supporting framework with a first suspension device,
    wherein said first suspension device is a first pendulum suspension device (15) configured to oscillate, so that said first shelf (13, 13') always maintains a substantially horizontal position regardless of a configuration of said supporting framework (12, 112), a symmetry axis of said structure coinciding with a symmetry axis of said first pendulum suspension device (15), and
    wherein said first pendulum suspension device comprises,
    a tubular element that is externally threaded so as to enable the first pendulum suspension device to be adjoined to the supporting framework,
    a coupling plate configured to be affixed to an upper portion of the first shelf,
    an upper ring nut screwed on the tubular element between the supporting framework and the coupling plate so as to be positioned at different distances from the coupling plate,
    an elastic spring positioned between the upper ring nut and the coupling plate, a force provided by the elastic spring being variable according to the different distances between the upper ring nut and the coupling plate, and
    a system for oscillating the coupling plate in relation to the tubular element.

2. The structure according to claim 1, wherein the system for oscillating the coupling plate in relation to the tubular element comprises a ball joint, a flexible joint, or a cardan joint.

3. A structure for transporting ready-made meals and various kinds of foodstuffs comprising:
    a supporting framework (12, 112); and
    a first shelf (13, 13') configured to support said foodstuffs,
    wherein said first shelf (13, 13') is adjoined to said framework with a first suspension device,
    wherein said first suspension device is a first pendulum suspension device (15), so that said first shelf (13, 13') always maintains a substantially horizontal position regardless of a configuration of said supporting framework (12, 112), a symmetry axis of said structure coinciding with a symmetry axis of said first pendulum suspension device (15), and
    wherein said framework (12) comprises two quadrilateral frames (16, 16') each consisting of four rods, and wherein said two quadrilateral frames surround the first shelf (13, 13') and are hinged to each other on opposite sides of said supporting framework in an intermediate portion of the structure.

4. The structure according to claim 3, wherein said two quadrilateral frames (16, 16') of said framework (12) are connected to each other to define an X-shaped configuration, said two quadrilateral frames being connected by a central rod (21) extending transversely between opposite sides of said two quadrilateral frames.

5. The structure according to claim 4, wherein the first shelf is adjoined to the central rod by the first pendulum suspension device, further comprising a further upper shaped rod (22) positioned astride of and parallel to the central rod (21) and bearing a second pendulum suspension device (15), which supports a second shelf (13').

6. A structure for transporting ready-made meals and various kinds of foodstuffs comprising:
    a supporting framework (12, 112); and
    a first shelf (13, 13') configured to support said foodstuffs, wherein said first shelf (13, 13') is adjoined to said framework with a first suspension device, and wherein said first suspension device is a first pendulum suspension device (15), so that said first shelf (13, 13') always maintains a substantially horizontal position regardless of a configuration of said supporting framework (12, 112), a symmetry axis of said structure coinciding with a symmetry axis of said first pendulum suspension device (15)

wherein said framework (112) comprises, an upper C-shaped part defined by vertical side rods (40) connected to an upper horizontal central rod (122), to which the first pendulum suspension device (15) is adjoined, and a lower part which comprises two pairs of legs (41, 42), each pair of legs being joined to one of the vertical side rods (40).

7. The structure according to claim 6, wherein each of said legs (41, 42) has, at one end thereof, a hole (55) configured for receiving a pin (43), the pin being further arranged to slide in a slot (46) formed at an end of one of the vertical side rods (40).

8. The structure according to claim 6, wherein each of said legs (41, 42) has a connecting rod (44) articulated, at one end, to the legs (41, 42) and at another end to one of the vertical side rods (40).

9. The structure according to claim 7, further comprising a further lower central rod (121), which connects said two pairs of legs (41, 42) positioned on two sides of the framework (112), and on which a further pendulum suspension device (15) of a second shelf (13') is attached.

10. The structure according to claim 9, wherein said lower central rod (121) has brackets (54) disposed at opposite ends and equipped with pins (43, 47) each articulated to one of said two pairs of legs (41, 42) and to a slot (45) formed at an end of one of the vertical side rods (40).

11. The structure according to claim 1, wherein said first pendulum suspension device is adjoined said framework by being adjoined to a crosspiece (21, 22; 121, 122) of said framework, and wherein said pendulum suspension device comprises a bottom plate (50), wherein a first portion of said bottom plate is affixed to an upper wall of the first shelf (13, 13') with a blocking screw (51), and wherein and a second portion of said bottom plate comprises a tubular element (52) in which a pin (53) for blocking and rotating the bottom plate (50) is inserted.

12. The structure according to claim 11, wherein said pin (53) for blocking and rotating the bottom plate (50) is removable.

13. A mounting kit for a structure for transporting food, the mounting kit comprising:

a transverse strut (216) connecting, to one another, external side supporting walls (211) of the structure for transporting food; and a suspension bracket (220) disposed in an intermediate area of the transverse strut (216), wherein the suspension bracket supports a pendulum suspension device (221) constrained and articulated to a containment and transporting shelf (227, 227'), further comprising end plates (217), configured to be constrained to said external side supporting walls (211) for receiving opposite ends (228) of said transverse strut (216).

14. The mounting kit according to claim 13, wherein said opposite ends of said transverse strut (216) are curved or hooked ends (228) of the transverse strut (216) adapted to be inserted in notches or housings (218) defined in said end plates (217).

15. The mounting kit according to claim 13, wherein said pendulum suspension device (221) has, on one side, an upper ring nut (222) configured to be screwed to, and unscrewed from, a tubular element (223) that is externally threaded, the tubular element having at a bottom end joined to a coupling plate (224) to a containment and transporting shelf (227, 227').

16. The mounting kit according to claim 15, further comprising a ball joint (226) between said tubular element (223) and said coupling plate (224), said ball joint allowing an oscillation between the coupling plate (224) and said transverse strut (216).

17. The mounting kit according to claim 15, further comprising, between said coupling plate (224) and said upper ring nut (222), an elastic spring (225) arranged coaxially with respect to the tubular element (223), the elastic spring providing a damping effect.

18. The mounting kit according to claim 14, further comprising an additional containment shelf (227') configured to hang from an upper wall (212) of the structure by way of an additional pendulum suspension device (221).

19. The mounting kit according to claim 13, wherein said structure is a rucksack.

20. The mounting kit according to claim 18, wherein said containment and transporting shelf (13, 13', 227, 227') is made as one piece.

21. The mounting kit according to claim 20, wherein said containment and transporting shelf (13, 13', 27, 21') is made of alveolar polycarbonate in at least partially blanked or punched sheet form.

22. The mounting kit according to claim 20, wherein said containment and transporting shelf (13, 13', 227, 221') comprises a plurality of panels articulated to each other by bending invitation lines (245), said plurality of panels defining walls of said containment and transporting shelf, and further comprises pass-through slits (246), in which connection tabs (247) are inserted.

* * * * *